UNITED STATES PATENT OFFICE.

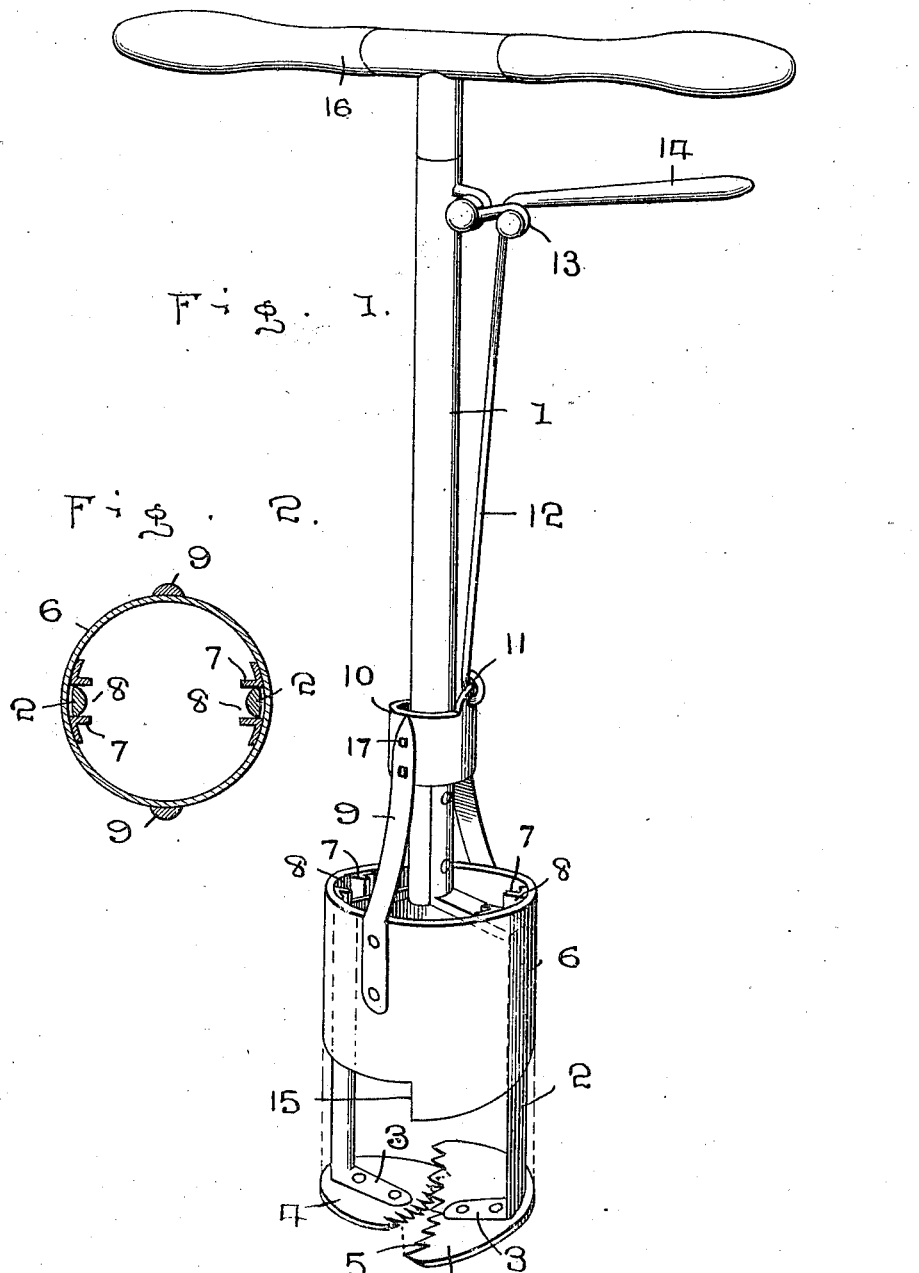

JOHN FRAHLICH, OF ARLINGTON, KENTUCKY.

AUGER.

972,611.  Specification of Letters Patent.  Patented Oct. 11, 1910.

Application filed July 20, 1909.  Serial No. 508,575.

*To all whom it may concern:*

Be it known that I, JOHN FRAHLICH, a citizen of the United States, residing at Arlington, in the county of Carlisle and State of Kentucky, have invented certain new and useful Improvements in Augers; and I do hereby declare the following to be a full, clear, and exact description of the invention, such as will enable others skilled in the art to which it appertains to make and use the same.

My invention relates to new and useful improvements in diggers and more particularly to that class adapted to be used for digging post holes and my object is to provide a device of this class which will have an auger action and readily enter the ground.

A further object is to provide means for holding the soil loosened by the auger when desired and a further object is to provide means for elevating the soil holding device whereby the soil may be discharged from the auger.

Other objects and advantages will be hereinafter referred to and more particularly pointed out in the claims.

In the accompanying drawings forming part of this application, Figure 1 is a perspective view of the auger complete showing the soil holding device in its elevated position, and Fig. 2 is a transverse sectional view through the upper portion of the auger.

Referring to the drawings in which similar reference numerals designate corresponding parts throughout the several views, 1 indicates the handle of my improved auger, to the lower end of which are secured shanks 2, said shanks being extended outwardly and downwardly and provided with feet 3 at their lower ends to which are attached cutting blades 4, which blades are preferably extended at an angle horizontally, the angle of one blade being opposed to the other, whereby said blades will have an auger action when the handle 1 is rotated.

In order to cause the cutting blades to readily enter the soil, the cutting edges thereof are provided with teeth 5, which will render said blades in condition to readily enter all kinds of soil.

In most instances, the soil can be raised and removed from the hole by means of the cutting blades 4, but when the auger is being used in a sandy or similar soil, a shield 6 may be provided, which is preferably cylindrical and adapted to fit around the shanks 2, the interior of the shield having angle irons 7 secured therein to form ways 8 for the reception of said shanks, thereby holding the shield against rotating.

Extending upwardly from the shield 6 are arms 9, which are attached to a collar 10 surrounding the handle, said collar having an ear 11 thereon with which engages the lower end of a rod 12, the upper end of said rod being attached to a loop 13 of a lever 14, said lever being in turn pivoted at its inner end to the handle 1 and by raising and lowering said lever, the shield 6 may be likewise raised or lowered.

In operation, when the auger is being used with sandy soil, the shield 6 is lowered into engagement with the cutting blades 4, said shield being provided with offsets 15 at its lower end to accommodate the inclined portions of the cutting blades, thereby providing a close union between the blades and shield. The digger is then placed in position and the handle 1 rotated through the medium of a cross bar 16 at the upper end of said handle. As soon as the digger has been rotated sufficiently to fill the shield 6, the auger is lifted from the hole and positioned at one side thereof, when the lever 14 is swung upwardly and the shield moved to the upper end of the shanks 2, thus releasing the soil and permitting the same to leave the digger.

Should the soil be of sufficient solidity to remain upon the blades as they are withdrawn, the shield may be readily removed by removing the bolts 17 employed for securing the upper ends of the arms 9 to the collar 10 and permitting the shield to move upwardly, when by removing the cross bar 16, the shield may be entirely disengaged from the digger.

It will thus be seen that I have provided a very cheap as well as strong and durable device and one that can be readily handled in view of its lightness. It will further be seen that by providing the shield for coöperating with blades, said digger may be used in various grades of soil and in view of the arrangement of the cutting blades, the digger will readily enter the soil without requiring pressure upon the handle.

What I claim is:

1. In a digger, the combination with a handle, depending shanks on said handle and oppositely inclined cutting blades carried by said shanks; of a shield surrounding said shanks and adapted to rest on said blades when in its lowered position, said shield having offsets for the reception of said blades, a collar surrounding said handle, arms connecting said collar and shield, a lever pivoted to said handle and a rod connecting said lever and collar whereby when the lever is raised and lowered, the shield will be correspondingly raised and lowered.

2. In a digger of the class described, the combination with a handle having depending shanks thereon and segmental cutting blades carried by the lower portions of said shanks, said blades being oppositely inclined and provided with teeth on the cutting edges thereof; of a tubular shield surrounding and slidably mounted on said shanks, said shield being provided with offsets on the lower portion thereof for the reception of said cutting blades, and means to raise and lower said shield when desired.

In testimony whereof I have signed my name to this specification in the presence of two subscribing witnesses.

JOHN FRAHLICH.

Witnesses:
 JAKIE OWEN,
 THOS. P. TUKER.